United States Patent [19]
Kennelly

[11] Patent Number: 4,483,421
[45] Date of Patent: Nov. 20, 1984

[54] VACUUM/HYDRAULIC CONTROL SYSTEM FOR SPEED SYNCHRONIZATION OF A PAIR OF SHAFTS

[76] Inventor: Kenneth M. Kennelly, Kerrville, Tex. 78028

[21] Appl. No.: 346,294

[22] Filed: Feb. 5, 1982

[51] Int. Cl.³ ............................................... B60T 1/08
[52] U.S. Cl. ...................................... 188/16; 60/547.1; 91/216 R; 91/536; 137/625.21; 188/2 D; 188/106 P; 188/354; 188/356; 192/85 V; 192/87.18; 303/6 A; 303/12
[58] Field of Search ..................... 188/16, 2 D, 106 F, 188/106 P, 345, 354, 356; 303/6 A, 12; 60/547.1, 581; 137/625.21; 192/85 V, 87.18; 91/216 R, 536

[56] References Cited
U.S. PATENT DOCUMENTS

| 793,058 | 6/1905 | Colhoun | 137/625.21 X |
|---|---|---|---|
| 1,682,781 | 9/1928 | Gardner | 303/6 |
| 1,713,992 | 5/1929 | Bragg et al. | 188/356 X |
| 1,897,591 | 2/1933 | Scholz | 91/536 X |
| 1,918,465 | 7/1933 | Gardner | 188/354 |
| 2,346,175 | 4/1944 | Matson | 188/354 |
| 2,466,837 | 4/1949 | Bohr | 188/354 |
| 2,583,307 | 1/1952 | Schneider | 188/354 X |
| 2,827,974 | 3/1958 | Frank | 91/216 A X |
| 3,425,221 | 2/1969 | Canfield | 188/356 X |
| 3,520,577 | 7/1970 | Moyes | 188/345 |
| 3,792,746 | 2/1974 | Phillips | 188/16 X |
| 3,796,232 | 3/1974 | Dalton | 137/625.21 |

FOREIGN PATENT DOCUMENTS

| 119753 | 4/1945 | Australia | 188/356 |
|---|---|---|---|
| 1023939 | 2/1958 | Fed. Rep. of Germany | 137/625.21 |
| 1940632 | 3/1971 | Fed. Rep. of Germany | 303/6 R |
| 1165248 | 5/1958 | France | 91/216 |

Primary Examiner—George E. A. Halvosa
Attorney, Agent, or Firm—Gunn, Lee & Jackson

[57] ABSTRACT

A supplemental brake system operates in cooperation with a motor vehicle's extant emergency brake system for selectively slowing a spinning wheel. A selector valve communicates with the vehicle's vacuum system and conduits are sized to cause a delay in the slowing of the spinning wheel. Further, the system provides for the gradual extension of the emergency brake cables which is unaffected by changes in vacuum levels in the vacuum system. The operator has full control of the vehicle during the system's operation.

3 Claims, 7 Drawing Figures

VACUUM/HYDRAULIC CONTROL SYSTEM FOR SPEED SYNCHRONIZATION OF A PAIR OF SHAFTS

BACKGROUND OF THE INVENTION AND PRIOR ART

This invention relates to a novel vacuum/hydraulic control system, and more particularly to a control system for synchronizing the speeds of a pair of shafts through control of the extension of brake cables commonly associates with motor vehicles.

Many times operators of motor vehicles find themselves in the annoying predicament of being stuck in a snowdrift, muddy road, or the like, where one drive wheel is resting on such a slippery spot that the coefficient of friction is too low to provide traction, with the result that the wheel spins, dissipating all the driving power of the engine, and the vehicle stands still. The characteristics of differentials in general use on motor vehicles are such that the wheel with no traction spins, and the wheel that has a good coefficient of friction with the road receives no torque.

Any number of methods and devices have been used to reduce the speed of the spinning wheel so that the wheel that has good traction receives torque, enabling the vehicle to move out of its stuck condition. U.S. Pat. No. 1,682,781 discloses such a control system. However, as can be seen in U.S. Pat. No. 1,682,781, the control system operates through a fluid hydraulic arrangement connected directly to the wheel brake mechanism. U.S Pat. No. 1,918,465 also discloses a control system which is adapted for use with the standard hydraulic braking systems in which the brake pedal operates a hydraulic pump from which conduits extend to the individual brakes.

An alternative method of obtaining individual brake control is seen in U.S. Pat. No. 2,466,837. Again, the invention disclosed in U.S. Pat. No. 2,466,837 utilizes a system which operates with a fluid under pressure and further includes conduits for the transfer of the fluid to the wheel brakes. With the aid of a distributing and cut-off valve connected to the brake master cylinder, from which valve the wheel brake conduits extend and through which valve under the appropriate operating conditions all wheel brakes except that of the spinning wheel are cut off from the braking fluid, depression of the brake pedal results in individual braking of the spinning wheel. Likewise, U.S. Pat. No. 2,346,175 discloses a control system providing valves in the fluid pressure lines to permit blocking the transmission of fluid pressure to those lines which connect the pedal cylinder with the brakes of the non-spinning wheels. In U.S. Pat. No. 2,583,307 a hydraulic control system is shown which synchronizes the speed of a pair of shafts, particularly those found in the rear axle of an automobile or truck. By using gear type, positive displacement pumps driven by the axle, in combination with pressure by-pass valving, the speed of the faster spinning wheel can be reduced.

None of the devices disclosed or known to the inventor operate on the vehicle's emergency braking system. All previous inventions are directly or indirectly linked to the vehicle's standard fluid hydraulic braking system. The obvious problems associated with such devices include modification of the hydraulic brake system with increased risks of leakage and interference with normal braking operation.

SUMMARY OF THE INVENTION

The present invention is adapted especially for use with the standard emergency braking system. In such systems, the operator activates the braking mechanism by movement of a control lever in the operating cab, causing the extension of brake cables attached to the conventional brake mechanism associated with the drive wheels. When the control lever is activated, both cables are simultaneously extended, resulting in a uniform braking action to both driven wheels.

Utilizing the already available vacuum created in the carburetion process as the prime motive source and in combination with fluid hydraulics, it is the object of the present invention to allow individual control over the braking action of each driven wheel without modification or disruption to the existing hydraulic brake system.

It is the object of the present invention to provide a fail-safe supplementary braking control system wherein a failure of any element of the supplemental system has no adverse impact on the standard functioning of basic braking system.

It is another object of the present invention to provide an audible warning signal to the vehicle operator indicating that the braking control system of this invention has been activated.

It is the object of the present invention to provide a positive retraction mechanism in the invention to facilitate the return of the vacuum/hydraulic power unit to a non-actuated position, thereby ensuring release of the braking action of the invention.

Another object of the present invention is that the present invention may be easily fabricated for simple installation on existing braking systems.

Additionally, it is an object of this invention to provide a gradual extension of the brake cables over a full range of vacuums by utilization of appropriately sized vacuum conduits.

It is yet another object of the invention to reduce the consequences of possible operator error by insuring a slow response time in the invention operation.

DETAILED DESCRIPTION OF THE INVENTION

Figure 1:
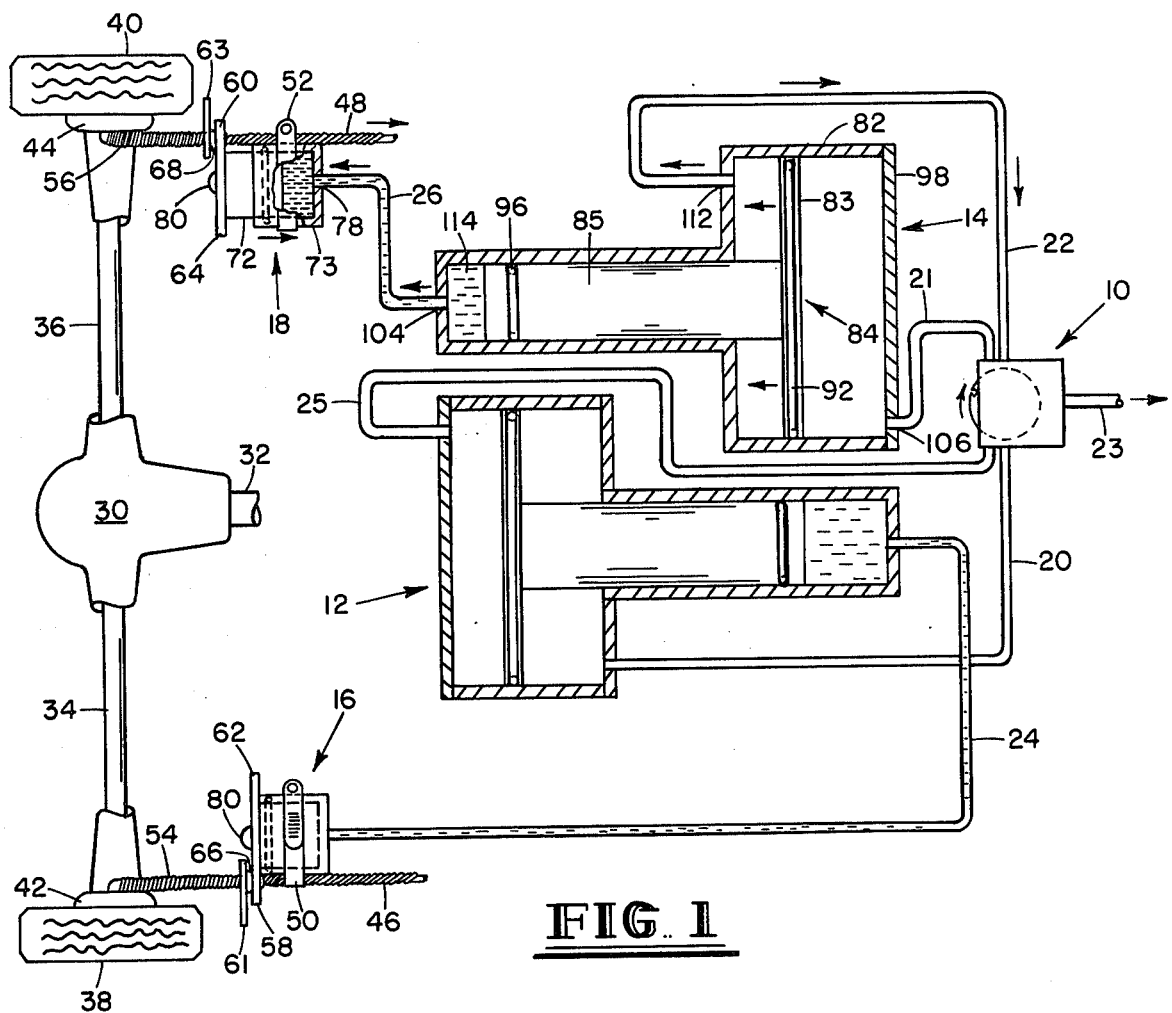
FIG. 1 is a semi-diagramatic view of the preferred embodiment of the invention applied to the braking mechanism of a motor vehicle.

FIG. 1 discloses a semi-diagramatic view of the device showing a selector switch 10, a right power unit 12, a left power unit 14, and a right slave cylinder 16 and a left slave cylinder 18. Selector switch 10 is connected to be selectively in communication with the right power unit 12 by means of right vacuum conduit 20. Selector switch 10 is connected to be selectively in communication with the left power unit 14 by means of left vacuum conduit 22. Selector switch 10 is also connected to a vacuum source (not shown) by means of a main vacuum conduit 23. In the preferred embodiment this vacuum source is vacuum system associated with the carburetor system of the internal combustion engine. Right power unit 12 is connected to be in fluid communication with right hydraulic slave cylinder 16 by means of right hydraulic conduit 24 while left power unit 14 is connected to be in fluid communication with left hydraulic slave cylinder 18 by means of left hydraulic conduit 26.

To provide for a positive retraction mode in power units 12 and 14, retraction conduits 21 and 25 are connected with selector switch 10 and power units 12 and 14, respectively. As will hereinafter be discussed, these retraction conduits 21 and 25 provide for communication between the vacuum source (not shown) and the power units 12 and 14 when the invention is in the retract mode.

Numeral 30 in FIG. 1 indicates the differential of a motor vehicle. A drive shaft 32 projects forwardly from the differential 30 and is driven by a source of power (not shown) such as an internal combustion engine. Projecting in opposite lateral directions from the differential 30 are a pair of rear axles 34 and 36 which are respectively fixed to the right and left driving wheels 38 and 40. The wheels 38 and 40 are respectively provided with suitable brake mechanisms 42 and 44 which are equipped with braking cables 46 and 48 respectively, in addition to the conventional hydraulically operated brake mechanism (not shown in detail).

The braking mechanisms 42 and 44 are preferably arranged so that extendable movement of brake cables 46 and 48 causes a braking action to the wheels 38 and 40. The extendable movement of brake cables 46 and 48 may be accomplished by pulling the motor vehicle's braking control lever (not shown) as is conventionally known; or, as will hereinafter be described in more detail, movement of right or left slave cylinders 16 and 18 respectively will result in extension of brake cables 46 and 48 because the hydraulic slave cylinders are detachably secured to the emergency brake cables 46 and 48 by means of clamps 50 and 52, respectively.

FIG. 1 further shows that the end portion of brake cables 46 and 48 are concentrically shielded by cable shields 54 and 56. Cable shields 54 and 56 pass through opening (not shown) in support brackets 61 and 63, and are secured from sliding through these openings by clips 66 and 68. Thus, brake cables 46 and 48 are secured to a frame member of the vehicle (not shown) by means of supoort brackets 61 and 63.

Figure 2:
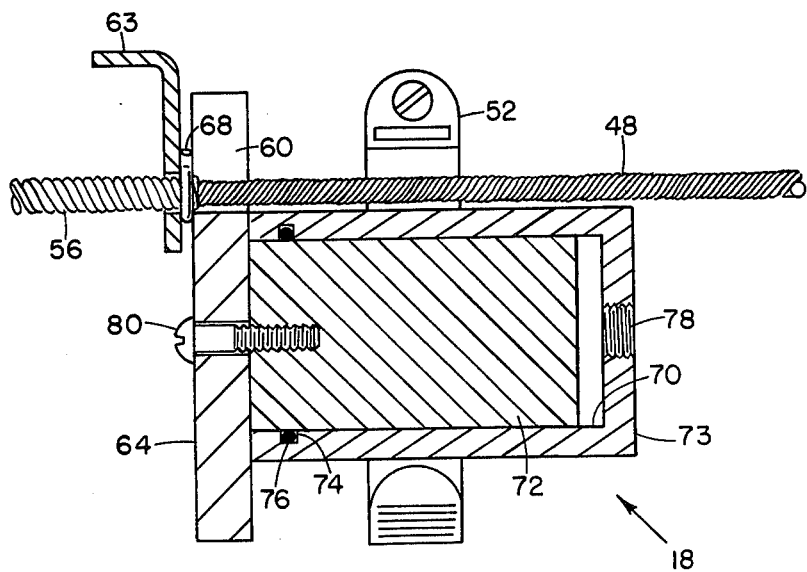
FIG. 2 is a side view of the left slave cylinder connected to an emergency brake cable.

FIG. 2 is a side view of left slave cylinder 18 securely connected to brake cable 48 by means of clamp 52. Left slave cylinder 18 has a polished inner bore 70 for receiving a slidable ram 72. Left slave cylinder 18 is further constructed with a circumferential groove 74 at one end of the inner bore 70 for receiving a sealing ring 76. Left slave cylinder 18 is further adapted at one end with a threaded orifice 78 for connecting hydraulic conduit 26. Securely fastened to ram 72 by means of fastener 80 is bracket 64. Bracket 64 has a notch 60 in the upper portion of bracket 64 to enable the brake cable 48 to slidably move through the notch 60. However, notch 60 is not so large as to allow clip 68 or the shield portion 56 of brake cable 48 to pass through the notch 60. (Construction of right slave cylinder 16 is identical to left slave cylinder 18.)

Figure 3:
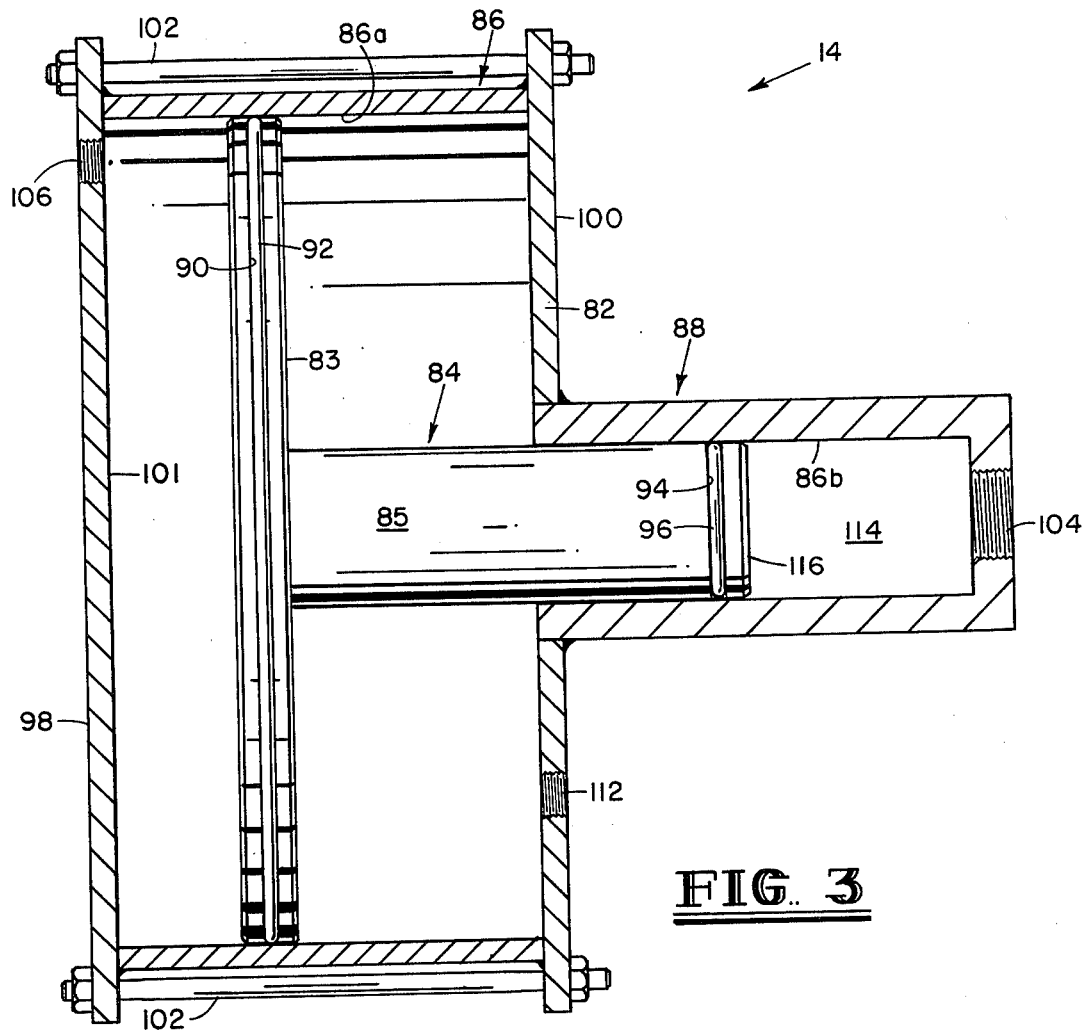
FIG. 3 is a side view of the power unit showing the details of its construction.

FIG. 3 is a side view of left power unit 14 showing the details of its construction. Power piston 84 is slidably mounted in power cylinder 82. Power cylinder 82 has a substantially cylindrical upper portion 86 and a substantially cylindrical bottom portion 88. Upper portion 86 has an inside diameter larger than the bottom portion 88, to take full advantage of the underlying hydraulic principles which are utilized in the invention.

Power piston 84 has a polished head portion 83 and a polished body portion 85. The head portion 83 is sized to slidably reciprocate within upper cylinder portion 86 while body portion 85 is sized to slidably reciprocate within bottom portion 88. Head portion 83 has a circumferential groove 90 for retaining piston ring 92 in position during movement of power piston 84. Body portion 85 also has a circumferential groove 94 for retaining piston ring 96 during the movement of power piston 84. Rings 92 and 96 function as seals producing substantially airtight seals against the internal cylinder walls 86a and 86b of cylinder 82 during the operation of the device as will hereinafter be described.

Power cylinder 14 may be constructed of sections of pipe or tubing of the desired diameters having polished interior surfaces. A first upper cylinder head plate 98 and a second upper cylinder head plate 100 are secured to each end of the upper portion 86 of power cylinder 82 by cylinder head securing means 102. One end of bottom portion 88 of power cylinder 82 is sealably connected to second upper head plate 100 and in axial alignment with the upper portion 86 by any suitable means such as welding or sealable threaded connections. The opposite end of the bottom portion 88 of power cylinder 82 is adapted to have a threaded orifice 104 to receive a threaded connector (not shown in FIG. 3) for connecting left hydraulic conduit 26 to power cylinder 82 for communication between conduit 26 and power cylinder 82.

Figure 4:
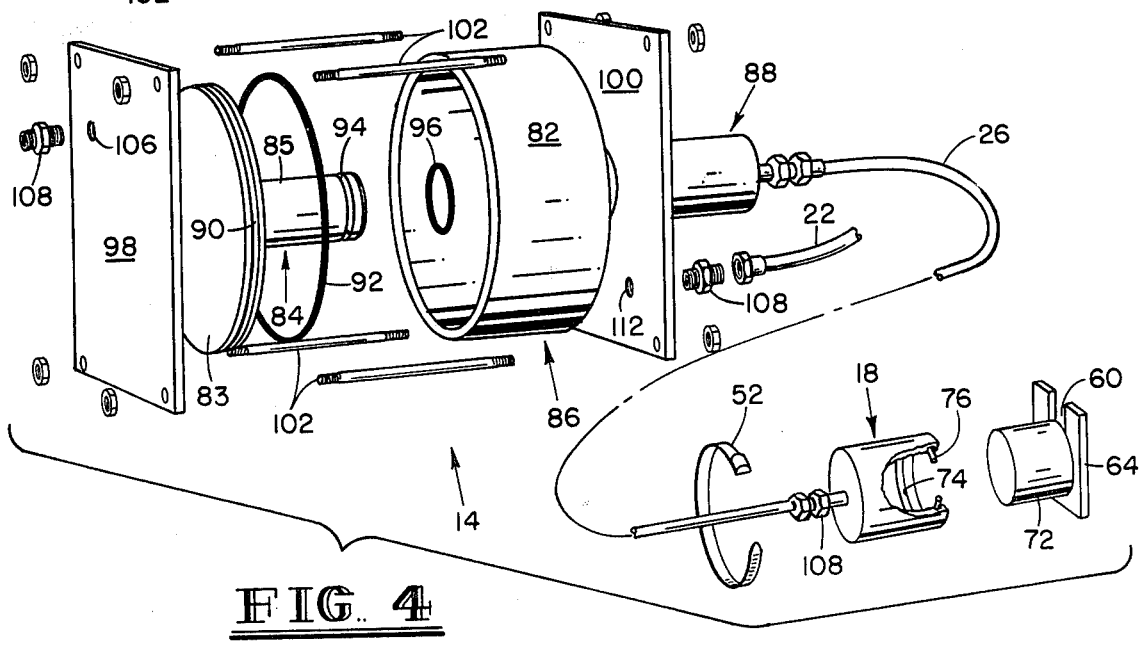
FIG. 4 is an exploded perspective of the invention.

First upper cylinder head plate 98 is provided with an upper cylinder vacuum port 106. Port 106 is threaded to receive a nipple adapter 108 (as shown in FIG. 4).

Retraction conduit 21 (as shown in FIG. 1) may be connected to nipple adapter 108 to provide retraction of power piston 84 when retraction conduit 21 communicates with the vacuum source (not shown) as when the selector switch 10 is positioned such that neither power unit 12 or 14 is activated.

An alternative means for providing this positive retraction mode would be accomplished by securing a spring means to under face 101 of first upper cylinder head plate 98 and the head portion 83 of power piston 84. Nipple adapter 108 could then either be connected to the vacuum source via retraction conduit 21 or simply allowed to function as a vent to atmosphere thereby eliminating the need for retraction conduit 21.

Second upper cylinder head plate 100 is provided with a second upper cylinder vacuum port 112 which is threaded. As can be seen in FIG. 1, vacuum port 112 selectively communicates with vacuum source (not shown) via conduit 22, selector switch 10, and vacuum conduit 23.

Figure 5:
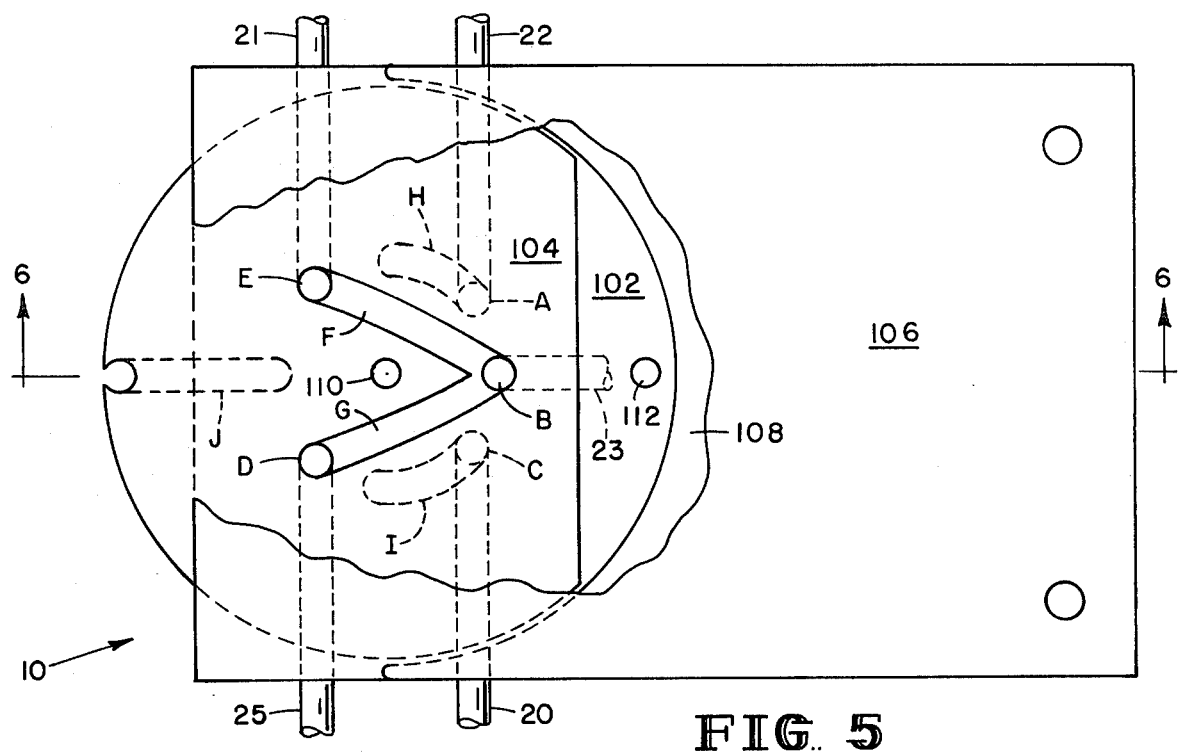
FIG. 5 is a top, partial cutaway, plan view of the control switch of the invention in the retract position.
Figure 6:
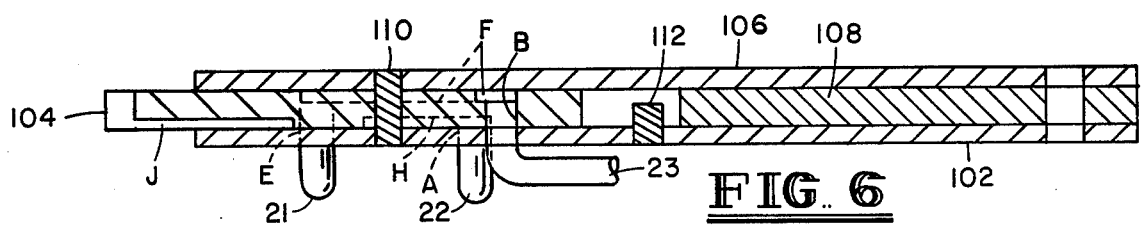
FIG. 6 is a cross-sectional elevation view of the control switch of the invention as shown in FIG. 5 in the retract position
Figure 7:
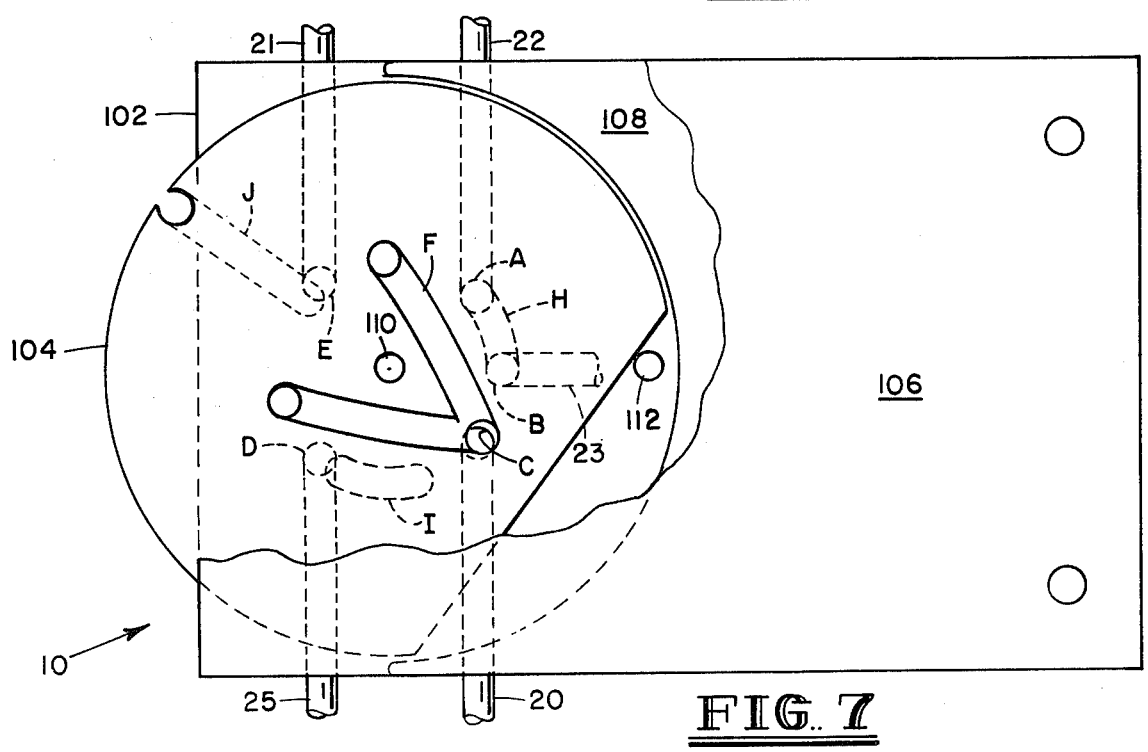
FIG. 7 is a partial cutaway plan view of the control switch of the invention in the left power mode.

FIGS. 5, 6, and 7 illustrate the construction of selector switch 10. FIG. 5 is a top, partial cutaway, plan view showing the various orifices and channels for selectively communicating the vacuum source with the power units 12 and 14. The selector switch 10 in FIG. 5 is shown in the "retract" position. As will be discussed hereinafter, when the invention is in "retract", the vacuum source tends to pull the power piston 84 closer to the first upper cylinder head plate 98.

Viewing FIG. 6, it can be seen that selector switch 10 is of multilayered construction, having a bottom section 102, a middle section 104, and a top section 106. A main vacuum port B extends vertically through bottom section 102 and middle section 104. Main vacuum conduit 23 is connected to communicate the vacuum source (not shown) to selector switch 10 through main vacuum port B.

A second orifice E extends vertically through bottom section 102 and middle section 104. Retraction conduit 21 is connected to selector switch 10 through orifice E. Power unit 14 is thus connected to selectively communicate with switch 10 via retraction conduit 21 or vacuum conduit 22.

A channel or groove F is formed in the top of middle section 104 extending from orifice E in middle section 104 to main vacuum port B in middle section 104.

In FIG. 5 it can be seen that when the selector switch 10 is in the retract mode position, any vacuum being drawn by the vacuum source would be communicated to power unit 14 via main vacuum conduit 23, main vacuum port B, channel F, orifice E, and finally through retraction conduit 21.

Retraction conduit 25 connects selector switch 10 to power unit 12 to achieve the same basic result in the same way as accomplished by retraction conduit 21. A third orifice D extends vertically through bottom section 102 and middle section 104. Retraction conduit 25 is connected to selector switch 10 through orifice D.

A second groove G is formed in the top of middle section 104 extending from orifice D in middle section 104 to main vacuum port B in middle section 104.

As can be further seen in FIG. 5, channels F and G form a "V" shape in the top of middle section 104 with the vertex at main vacuum port B in middle section 104. Again, when the selector switch 10 is in the retract mode position, and when vacuum is being drawn by the vacuum source, such vacuum would be communicated to power unit 12 via main vacuum conduit 23, main vacuum port B, channel G, orifice D, and finally through retraction conduit 25.

Middle section 104 is located at one end of selector switch 10 but does not extend the full length of selector switch 10. Middle section 104 has a generally semi-circular shape.

Located at the other end of selector switch 10 is a spacer member 108. As can be seen in FIGS. 5 and 7, spacer member 108 has an arc formed in one end which correspond generally to the radius of curvature of middle section 104 to enable middle section 104 to rotate within switch 10.

Middle section 104 is pivotally mounted between bottom section 102 and top section 106 by means of pivot pin 110. To facilitate ease in pivoting and to reduce vacuum leakage, vacuum grease is applied to both the top and bottom surfaces of middle section 104.

Stop pin 112 is securely set and positioned within bottom section 102, extending vertically, so as to limit clockwise or counterclockwise rotation of middle section 104 during the selection of the invention's operation modes. When middle section 104 is rotated clockwise until middle section 104 abuts against stop pin 112, the selector switch 10 is in the left power mode, as can be seen in FIG. 7. Likewise, when middle section 104 is rotated counterclockwise until it abuts against stop pin 112, the selector switch 10 is in the right power mode.

The bottom of middle section 104 is adapted with a third channel or groove J extending to the rear of middle section 104 and is open to atmosphere. Viewing FIGS. 5 and 6, it can be seen that when selector switch 10 is in the retract mode position, channel J does not communicate with any other orifice or conduit in selector switch 10. However, when middle section 104 is rotated clockwise to place the switch in the left power mode position, channel J generally aligns with orifice E in bottom section 102 and thusly with retraction conduit 21. Likewise, when middle section 104 is rotated counterclockwise to place selector switch 10 in the right power mode position, channel J aligns with orifice D in bottom section 102 and thusly with retraction conduit 25.

Further, the underside of middle section 104 has formed in it two small arc shaped channels or grooves H and I. Channel H is formed and positioned on the under side of middle section 104 such that when middle section 104 is rotated to the left power mode position (clockwise), channel H will align with orifices A and B in bottom section 102, as can be seen in FIG. 7.

Channel I is formed and positioned in the under side of middle section 104 such that when middle section 104 is rotated to the right power position (counterclockwise), channel I will align with orifices C and B in bottom section 102.

FIG. 7 further shows that when channel H is aligned with orifices A and B (left power mode), channel I does not necessarily align with anyother orifice in selector switch 10. Likewise when channel I is aligned with orifices B and C (right power mode) channel H is not necessarily aligned with any other orifice in selector switch 10.

All conduits utilized in the preferred embodiment of the invention are sized such that there is a gradual extension of brake cables 46 and 48 over a full range of vacuums developed by the vacuum source and to insure a slow response time in the invention's operation. Thus, in the preferred embodiment, main vacuum conduit 23, vacuum conduits 20 and 22, and retraction conduits 21 and 25 are 1/16" to ⅛" inside diameter. Restriction orifices or reduction adapters can also be inserted in the conduits to further control the speed and response time of the invention.

Hydraulic conduits 24 and 26 are generally 3/16" inside diameter in the preferred embodiment, but other sizes can be utilized to regulate the response time of the invention.

OPERATION OF THE PREFERRED EMBODIMENT

In discussing the operation of the invention, it is convenient to discuss the functioning of one set of the power and slave cylinders, since the other set functions identically, when selected For this reason, the following discussion will focus on the left side, involving power cylinder 14 and slave cylinder 18.

Referring to FIG. 1, slave cylinder 18 is securely attached to brake cable 48 by means of clamp 52, ensuring that notch 60 in bracket 64 is aligned so as to allow cable 48 to pass through the notch 60. Brake cable 48 should be positioned such that brake mechanism 44 is not engaged. Further, slave cylinder 18 is located on the brake cable 48 such that slave cylinder 18 fully abuts against bracket 64 which in turn abuts against clip 68 and support bracket 63.

The bottom portion 88 of power unit 14 is then filled with suitable hydraulic fluid. This is accomplished by connecting one end of hydraulic conduit 26 to orifice 104 and retracting power piston 84 while inserting the opposite end of hydraulic conduit 26 in a container of hydraulic fluid.

Power piston 84 is retracted within power unit 14 when head portion 83 is positioned close to first upper cylinder head plate 98.

As can be seen in FIG. 3, a reservoir area 114 is thus formed between the face 116 of body portion 85 and the interior cylinder walls 86b. Reservoir area 114 and hydraulic conduit 26 are thusly filled with hydraulic fluid. Once the system is filled with hydraulic fluid, the second end of conduit 26 is connected to slave cylinder 18 at orifice 78.

To provide the motive force for moving power piston 84 within power cylinder 82, power unit 14 must be connected to communicate with the vacuum system on the internal combustion engine. One end of vacuum conduit 22 is connected to cylinder 82 through port 112, the other end of vacuum conduit 22 is connected with selector switch 10 at orifice A. One end of retraction conduit 21 is connected to vacuum nipple 108 while the other end of retraction conduit 21 is connected with selector switch 10 at orifice E.

When selector switch 10 is in the retract position as shown in FIG. 5, vacuum is drawn through main vacuum conduit 23, through main vacuum port B in bottom section 102 and middle section 104 of switch 10, through channel F in top of middle section 104 of switch 10, through orifice E of middle section 104 and bottom section 102 of switch 10, through retraction conduit 21, to power cylinder 82 through vacuum nipple 108, thus communicating the vacuum source with the left power unit 14 to cause power piston 84 to remain in the "retract" position. In the same manner when the selector switch 10 is in this "retract" position, the vacuum source is also communicating with the right power unit 120 through a similar flow route causing its associated power piston to remain in the "retract" position.

To activate the invention to cause a braking action on the left drive wheel 40, called "left power mode", selector switch 10 is moved to the position shown in FIGS. 1 and 7 while the vehicle engine is operating at a steady vacuum level. As can be seen in FIGS. 1 and 7, vacuum is drawn through main vacuum conduit 23, through main vacuum port B in bottom section 102 through channel H in the underside of middle section 104 of switch 10, through orifice A in bottom section 102, through vacuum conduit 22 to cylinder 82 through port 112. Since the vacuum source is now communicating with power cylinder 82 through port 112, power piston 84 is pulled in the direction of the second upper head plate 100.

As can be seen in FIG. 7, when selector switch is moved as just mentioned, to the left power mode position, channel J in the underside of middle section 104 of switch 10 has been rotated to communicate with orifice E in the bottom section 102 of switch 10 and atmosphere. Positioning selector switch 10 as just mentioned and seen in FIGS. 1 and 7 results in an audible hissing sound, warning the operator that the invention has been activated to a power mode.

Returning to the description of the device in operation and viewing FIG. 1, movement of power piston 84 forces the hydraulic fluid in reservoir area 114 through hydraulic conduit 26 to slave cylinder 18. The hydraulic forces created by the movement of power piston 84 force against ram 72 connected to bracket 64. Since bracket 64 abuts against support bracket 63, which is rigidly connected to the frame of the vehicle (not shown), slave cylinder 28 moves away from ram 72 extending brake cable 48 which is tightly held against slave cylinder 18 by means of clamp 52.

As brake cable 48 is extended, braking mechanism 44 is activated, slowing rotation of left wheel 40, achieving one of the purposes of the invention.

Although the foregoing discussion details the function of the invention in slowing the left drive wheel, the same discussion could be made for the right drive wheel. To avoid repetition, details relating to the activation of the right drive wheel will not be discussed. However, the reader should note that movement of selector switch 10 as shown in FIGS. 1 and 7 does not affect the operation of right power unit 12, right slave cylinder 16, right braking mechanism 42, or right drive wheel 38. Since the power piston associated with the right power unit 12 is in "retract", movement of switch 10 to position shown in FIGS. 1 and 7 will not cause the power piston of unit 12 to move.

In the typical motor vehicle having an internal combustion engine, a relatively steady state vacuum exists at a constant throttle setting. Vacuums in the 15-16 Hg range are normal. When the engine rpm is increased and suddenly reduced, the vacuum levels suddenly increase. By appropriately sizing the various conduits of the invention, sudden changes in vacuum levels do not adversely affect the operation of the invention.

Further, should any malfunction occur with regard to the invention, the vehicle's conventional braking system is not adversely affected.

While the invention has been described in connection with the preferred embodiment, it is not intended to limit the invention to the particular forms set forth; but, on the contrary, it is intended to cover alternatives, modifications, and equivalents as may be included within the spirit and scope of the invention as defined by the appended claims.

I claim:

1. A supplemental braking system for a multiple wheeled motor vehicle, said motor vehicle having a common differential, a customary hydraulic brake system, a cable operated emergency brake system and a vacuum system, said supplemental system operating in cooperation with said vehicle's extant cable operated brake system for selectively slowing a spinning wheel of said vehicle, said wheel being in operative connection with said differential comprising:

a selector valve in communication with said vehicle's vacuum system via a first vacuum conduit sized to cause a delay in said slowing of said spinning wheel;

second and third vacuum conduits selectively in communication with said selector valve and sized to cooperate with said first conduit in said delay;

first and second vacuum-over-hydraulic power means in vacuum communication with said second and third conduit, respectively;

first and second emergency brake cable actuators in fluid communication with said first and second vacuum-over-hydraulic power means via a first and second hydraulic conduit, respectively, said hydraulic conduits sized to cooperate with said first, second, and third vacuum conduits in causing said delay in said slowing of said spinning wheel, said first actuator being detachably connected to the cable of said extant emergency brake for a first wheel and said second actuator being detachably connected to the cable of said extant emergency brake for a second wheel;

whereby an operator may gradually slow said spinning wheel of said vehicle by causing said first vacuum conduit to communicate with said first or said second vacuum conduit by positioning of said selector valve, said system having a response time delayed such that said operator may have full control of said vehicle when said slowing begins and which is unaffected by sudden changes in vacuum levels in said vacuum system.

2. Claim 1 wherein one of said actuators is positioned near each of said wheels of said vehicle, each of said actuators further comprises a cylinder adapted to receive a slidable ram therein, said cylinder being in fluid communication with one of said vacuum-over-hydraulic power means, said ram having a bracket thereon having an opening large enough to allow one of the emergency brake cables of said emergency brake system to slide through to gradually slow said spinning wheel but not large enough to allow a shielded portion of said brake cable to pass through said opening; said cylinder detachably secured to said cable such that said opening in said bracket is axially aligned with said cable, said bracket further abutting and pushing against a cable support bracket securely affixed to said vehcile's frame when said supplemental system is in operation.

3. Claim 2 wherein said selector valve means further comprises an audible warning means for indicating that either of said first or second power means has been activated by selective positioning of said selector valve.

* * * * *